United States Patent
Ishikawa et al.

(10) Patent No.: US 7,596,664 B2
(45) Date of Patent: Sep. 29, 2009

(54) COLLAPSED DISTRIBUTED COOPERATIVE MEMORY FOR INTERACTIVE AND SCALABLE MEDIA-ON-DEMAND SYSTEMS

(75) Inventors: Edison Ishikawa, Rio de Janeiro (BR); Cláudio Luis Amorim, Rio de Janeiro (BR)

(73) Assignee: COPPE/UFRJ, Rio de Janeiro (BR)

( * ) Notice: Subject to any disclaimer, the term of this patent is extended or adjusted under 35 U.S.C. 154(b) by 277 days.

(21) Appl. No.: 10/508,433

(22) PCT Filed: Sep. 30, 2002

(86) PCT No.: PCT/BR02/00137

§ 371 (c)(1), (2), (4) Date: Sep. 20, 2004

(87) PCT Pub. No.: WO03/083597

PCT Pub. Date: Oct. 9, 2003

(65) Prior Publication Data

US 2005/0160137 A1    Jul. 21, 2005

(30) Foreign Application Priority Data

Apr. 2, 2002    (BR) .................................... 0201115

(51) Int. Cl.
*G06F 12/00* (2006.01)
*G06F 13/00* (2006.01)
*G06F 13/28* (2006.01)

(52) U.S. Cl. ...................................... 711/129; 711/133
(58) Field of Classification Search .................. 711/129, 711/133
See application file for complete search history.

(56) References Cited

U.S. PATENT DOCUMENTS

| 5,412,483 | A | * | 5/1995 | Ludlow et al. | 358/401 |
| 5,915,094 | A | * | 6/1999 | Kouloheris et al. | 709/219 |
| 5,933,603 | A | * | 8/1999 | Vahalia et al. | 709/225 |
| 5,974,503 | A | * | 10/1999 | Venkatesh et al. | 711/114 |
| 6,061,504 | A | * | 5/2000 | Tzelnic et al. | 709/219 |
| 6,154,813 | A | * | 11/2000 | Martin et al. | 711/133 |
| 6,463,508 | B1 | * | 10/2002 | Wolf et al. | 711/133 |
| 6,842,836 | B2 | * | 1/2005 | Yun et al. | 711/167 |
| 6,986,018 | B2 | * | 1/2006 | O'Rourke et al. | 711/213 |
| 7,096,481 | B1 | * | 8/2006 | Forecast et al. | 725/32 |
| 7,181,523 | B2 | * | 2/2007 | Sim | 709/226 |
| 2001/0052008 | A1 | * | 12/2001 | Jacobus | 709/223 |
| 2003/0093803 | A1 | * | 5/2003 | Ishikawa et al. | 725/94 |
| 2003/0236961 | A1 | * | 12/2003 | Qiu et al. | 711/170 |

* cited by examiner

*Primary Examiner*—Sheng-Jen Tsai
(74) *Attorney, Agent, or Firm*—Fildes & Outland, P.C.

(57) ABSTRACT

This invention treats of a two-level cache management method for continuous media files of a proxy server. In the first level, the method reserves collapsed buffers in the cache for every active client attended by the proxy server. To save bandwidth and memory space collapsed buffers can be concatenated and overlapped when content belongs to the same continuous media file. The proxy manages collectively the collapsed buffers of each client, which cooperate by making its content available to the whole system, reducing traffic over the communication network and on the media-on-demand server. In the second level, the method allows proxy servers to cooperate between themselves, by concatenating collapsed buffers when necessary, increasing the amount of available shared media in the cache, saving bandwidth both on the media-on-demand server and on the communication network backbone.

13 Claims, 9 Drawing Sheets

| 413 | MEDIA ID |
| --- | --- |
| 414 | MEDIA DURATION |
| 415 | SLOT SIZE |
| 416 | NUMBER OF GOFS |
| 417 | NUMBER OF SLOTS |
| 418 | MEDIA RANK |
| 419 | LIST OF WAITING CLIENTS |
| 420 | LIST OF PAUSED CLIENTS |
| 421 | LIST OF INPUT CONNEXIONS |
| 422 | POINTER TO LCMU |
| 423 | POINTER TO LSU |

| 432 | SLOT ID |
| --- | --- |
| 433 | SLOT STATUS |
| 434 | FAST FORWARD STATUS |
| 435 | FAST REWIND STATUS |
| 436 | LIST OF ACTIVE CLIENTS |
| 437 | LIST OF CLIENTS IN FAST-FORWARD |
| 438 | LISTA OF CLIENTS IN FAST-REWIND |

| 452 | UNIT NUMBER |
| --- | --- |
| 453 | PRIORITY |
| 454 | TIMESTAMP |
| 455 | DURATION |
| 456 | POINTER TO THE CACHE |

| 432 | BLOCK SIZE |
| --- | --- |
| 433 | POINTER TO NEXT BLOCK |
| 434 | BLOCK |

COLLAPSED DISTRIBUTED COOPERATIVE MEMORY FOR INTERACTIVE AND SCALABLE MEDIA-ON-DEMAND SYSTEMS

TECHNICAL FIELD

The present invention refers to the cache management system (CMS) of a proxy server to store a single or multiple media of continuous flow such as video or audio being accessed from a Media-on-Demand (MoD) server by one or several users. The proxy server hereafter called proxy, reserves part of its cache memory for every user that starts a multimedia session. In this way, users can have smaller buffers, which reduce costs of set-top-boxes and client equipments, since the user buffer is complemented by the client's part in the reserved cache of the proxy. To optimize cache performance, the reserved part for a client can be superimposed by the part of another client, provided the two parts have the same contents, thus avoiding replication of redundant contents and increasing the rate of media reuse. These reserved cache parts can also be concatenated in such a way to further increase the reuse of media contents. The concatenation can happen inside of a single proxy cache or between several proxy caches in a cooperative way. The concatenation of parts of proxy caches is also used to offer facilities of videocassette recorder (VCR) operations. The non-reserved part of the cache is used either to store fragments of most popular media or to increase the concatenation degree of the cache's reserved parts. In this way, it is possible to increase the scalability of MoD systems while implementing VCR operations to offer an interactive system to the users of the MoD system.

PREVIOUS TECHNIQUES

The Distributed Cooperative Memory (DCM), as have been previously defined by PCT/BR 01/00029 of 26, Mar. 2001, changes the paradigm of the video-on-demand (VoD) system, from the conventional client-server to the peer-to-peer one. DCM allows the implementation of scalable and interactive VoD systems using a communication infrastructure based on symmetrical large bandwidth in which the uplink bandwidth is equal to the downlink bandwidth, allowing client uplink bandwidth to be exploited so that client equipment can also become a server by recycling the video flow that it receives. Such a communication infrastructure is more often available only at large companies, research centers, or at academic institutions, which currently restricts its use to corporative users.

The home user has no access yet to this kind of communication infrastructure, since providing it at a large scale is still unfeasible due to the high implementation costs of the so-called 'last-mile'. There exists a high-speed communication backbone, but connecting thousands of users to it through large-bandwidth links would require great investments. However, those thousands of users are already connected to a telephony infrastructure based on copper wires, an investment that the telecommunication companies want to preserve while taking advantage of it to offer communication services based on large bandwidth. Another option is to use wireless network technology, whose quick installation and cost-reduction trends, can make it a viable alternative for offering large bandwidth access to the end user in the near future.

In this technological context, the ADSL (Asymmetrical Digital Subscriber Line) technology was developed, which enables a conventional telephone line to transmit digital information, with downlink bandwidth being much larger than that of uplink and using the same pair of copper wires already installed at user's home. The explanation is that a client usually receives much more information than sends, so that a client uplink with small bandwidth to allow interactivity and voice transmission is enough to support immediate user's needs, and the remainder bandwidth that can be exploited in conventional telephone lines is left to the client downlink. ADSL lines converge to a central station called DSLAM (Digital Subscriber Line Access Multiplexer), similar to a central telephone station, which in turn is interconnected by a high-speed network. Recently, other access technologies grouped together under the acronym xDSL have been developed, which comprise both symmetrical and asymmetrical accesses with different data transmission speeds. Note that everything that has been stated for ADSLs can be also applied to xDSLs.

In case of wireless access, the available bandwidth is also limited but already guarantees bandwidth up to 12-Mbps for point-to-point access, which allows to comfortably transmitting a good-quality video. For point-to-point wireless network also there exists a central access point (CAP) usually called the Head end.

In case of users being connected directly to a high-speed network either through a router or switch, either equipment becomes the access point.

To make viable the use of DCM within this kind of communication infrastructure, the client buffers of standard DCM were collapsed in the central access points (CPAs) such as DSLAMs, Head ends, or routers/switches, in their existing memories or in proxies connected to them. The proxies work on symmetrical and asymmetrical architectures, and can be located at any point of the network; the difference is that the proxy will use the C-DCM (Collapsed Distributed Cooperative Memory) for its cache management. To summarize, a proxy can be distinct from CPA or can be incorporated into it. The policy of cache management of a C-DCM proxy differs in several aspects from traditional policies such as LRU (Least Recently Used) or MRU (Most Recently Used) since the exploration of 'hot data sets' does not apply to large files. Also, C-DCM policy differs from multimedia policies such as BASIC, DISTANCE, INTERVAL CACHING (IC) and GENERALIZED INTERVAL CACHING (GIC) in the detail of its operation, more specifically, in its way of allocating buffers to video flows. While traditional management methods search for increasing cache hit rates using replacement of video contents, C-DCM guarantees cache hit by reserving part of the cache and using replacement policies only to increase even more the reuse of contents. C-DCM also differs from caches in disk since C-DCM's objective is to have video content in memory so that it can be promptly transmitted to the client whose buffer was collapsed in a nearby CPA. In other words, the main objective of C-DCM is not to store contents in disks, though the use of disks is not excluded, on the contrary, disk storage has advantages that are orthogonal to the ones that C-DCM offers, so that both techniques can be used to increase system performance.

The cache management policies for multimedia systems, like MoD systems, take into account that multimedia objects are too large so storing the entire object in cache does not offer a good cost/benefit ratio. Therefore, these policies retain only fragments of objects not the whole object, besides they attempt to explore the relationship between different flows delivered to the clients, taking into account always the sequential access pattern.

C-DCM is different from standard DCM because it also works with an asymmetrical communication infrastructure, by centralizing the existing memory space of client buffers in the central access points, and offering a robust and optimized VoD service. In addition, C-DCM maintains the advantages of standard DCM, since it alleviates the VoD server and its communication links from an excessive workload in a manner that the resulting VoD system becomes scalable and interactive.

SUMMARY OF THE INVENTION

The present invention implements a method for memory cache management of proxy servers for continuous media such as video and audio. The method can be divided in two parts. The first part treats the cache management of a single proxy server, that is, the local C-DCM. The second part addresses the cooperation between proxy servers to share media contents they store in their caches, that is, the distributed method of C-DCM. The C-DCM can be used in its local form as well as in its distributed form.

The local C-DCM method reserves a space in the proxy cache for each client that starts a session. This space represents part of the client buffer that was collapsed in the proxy. To manage all the independent cache spaces so as to avoid useless replication of contents while maximizing media reuse a circular structure of superimposed data is created. In this structure, the continuous media is represented by the list of continuous media units (LCMU) and cache units called slots, for which clients make reservation, represented by the list of slot units (LSU).

If the continuous media is a video stream, the LCMU unit is given by GoFs (Group of Frames) that are indexed by timestamps in time units. The size of each LSU unit usually comprises several LCMU units. Since each LCMU unit does not have necessarily a fixed size in time units, the number of LCMU units that a LSU can have is given by an average size, defined as the ratio given by the size of LSU unit divided by the average time of a GoF. Assuming that LCMU GoFs are preferably ordered clockwise and in increasing order of timestamps, the LSU rotates preferably clockwise over the LCMU, which is fixed, and with a speed equal to that of the continuous media presentation. The LSU is also an ordered list, but preferably counterclockwise.

Both LCMU and LSU are preferably lists of is pointers. The LCMU is a list that points to the cache area in which GoFs are stored. The LSU is a list that points in the LCMU the beginning and end of slots. If a LSU slot is reserved, its content, which lies between the two slot pointers, cannot be discarded.

On starting a session, the C-MCD manager reserves some contiguous LSU slots that correspond to the initial media content as requested by the client. These contiguous slots correspond to the buffer that should exist at the client in its totality, being preferably mapped onto the beginning and end pointers, read and write pointers, and maximum and minimum level pointers of the buffer.

The flow that arrives at a proxy is stored in the cache and mapped on the LCMU with a reservation priority given by its corresponding slot at that instant of time, that is, if between the read and end pointers there is video content, this should not be discarded. If there is content after the end of buffer, it means that an overflow occurred, i.e., the GoF is eligible to be discarded, but with a lower priority than the GoF that has just left out of the buffer, since it has already been read.

Two users can start a session to watch the same media apart from a small time interval (less than a slot size), in this case the collapsed buffers will share the same slots. If the time interval is larger than a slot, the collapsed buffers will share only the slots that overlap. If the time interval between accesses is up to a slot greater than the size of collapsed buffer, the slots that comprise these buffers will be contiguous to ensure a continuous stream of stored media. If the time interval is one or more slots greater than the collapsed buffer, the reserved slots will not be contiguous, thus the contents of non-reserved slot(s) that join the collapsed buffers can be discarded from the cache, depending on both the popularity rank of the film and the distance until next reuse.

The lesser popular the film and larger the distance of its reuse (period of time for the film to enter into the next collapsed buffer) the greater is its probability of being discarded. Temporary slots can be used to reserve the content of slots between two buffers, provided that there is room in the cache and the distance between them is small.

In order to avoid keeping slots reserved and contents occupying memory space unnecessarily, a process of garbage collect periodically verifies the clients that become inactive and release the associate slots and contents they reserved.

The distributed C-DCM allows the contents of proxies to be shared. For this purpose, every time a collapsed buffer needs to receive a flow to refill its content it will preferably ask for the flow to the nearest the states of the proxies that form the system and will ask the content directly to whom possesses it. Similarly, the collapsed buffers can be either superimposed or concatenated, which guarantees the continuous media flow; in case they are not, temporary buffers can be created to guarantee that the flow content is not discarded unexpectedly.

BRIEF DESCRIPTION OF THE DRAWINGS

The goals, advantages, and characteristics of the invention are easier to understand and described better if the following detailed description is read together with the following figures.

DETAILED DESCRIPTION OF THE INVENTION

Figure 1:
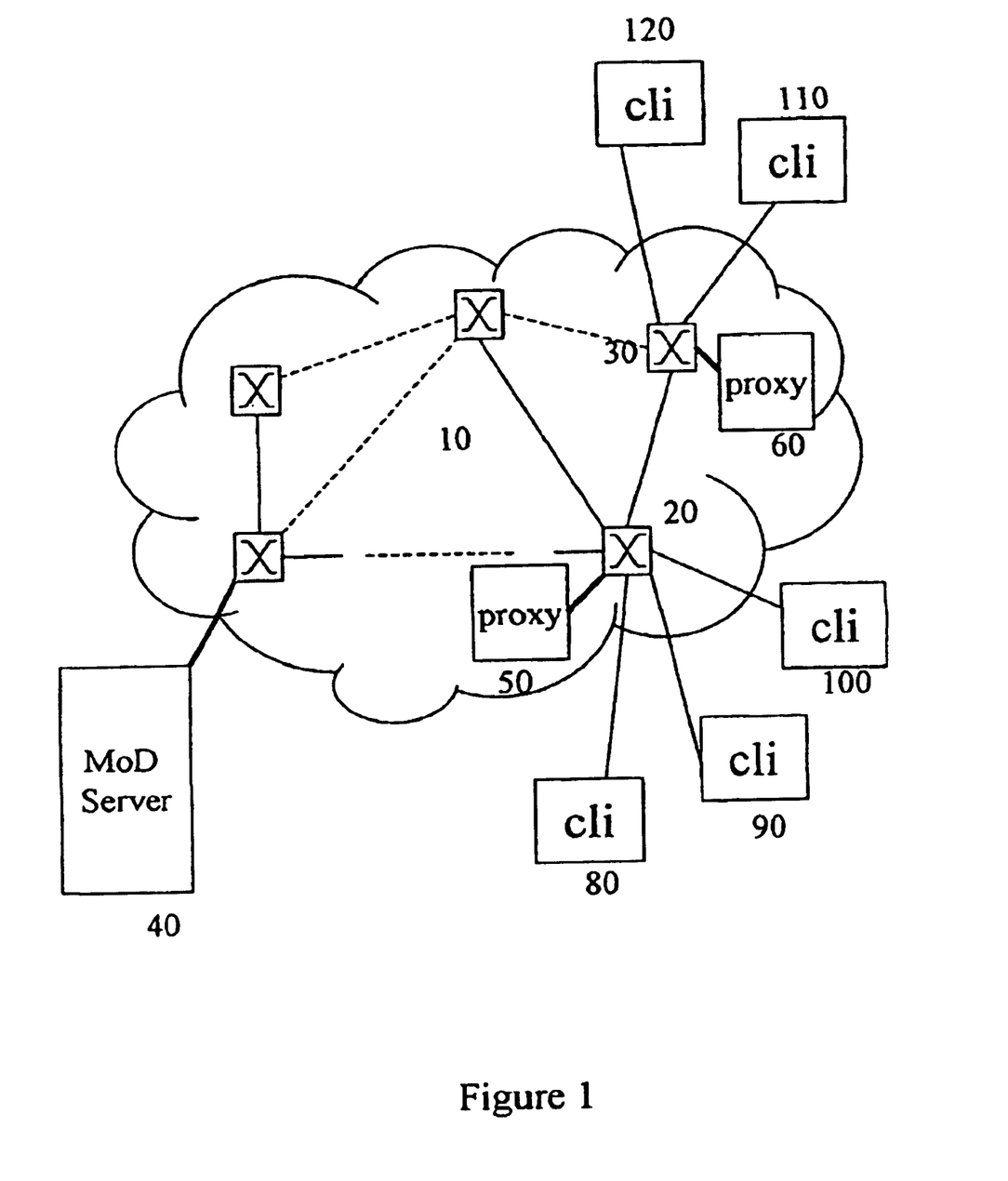
FIG. 1 shows a generic architecture of the system used in the present invention.

The present invention implements a method to allocate collapsed buffers in proxies FIG. 1 50 and 60. The method uses a technique to determine whether the content of a proxy's cache will be reused or not in the future, such that the proxy's cache space can be assigned (or released) to store new content so as to reduce the load on the MoD server FIG. 1 40 and reduce the communication traffic on the communication network backbone FIG. 1 10 and also that the content can be re-transmitted to other proxies so it can be reused by other clients in the system.

In the FIGS. 1, 20 and 30 are central access points, which can be DSLAMS, Head ends, or even routers or switches. The proxies FIG. 1 50 and 60 can or cannot be embedded in the central access points.

The Client

Clients in the FIGS. 1, 80, 90, 100, 110 and 120 represent client equipments from simple set-top-boxes to multimedia computers or residential gateways. Clients connect preferably to the nearest proxy. The client equipment usually has a buffer to store segments of continuous media for decoding purpose and also to reduce the problem of system jitter (the statistical variance of delays). The larger is the jitter the greater is the amount of memory that is necessary to avoid overflow or underflow in the client buffer. The task of managing the jitter that nearest proxy. In this way, the proxy will reserve a buffer for that client, called collapsed buffer, which can be shared with other clients, and thus can have other functions that will be detailed further. Since the jitter as perceived by the client will be the one from the last network segment, it will be smaller, and thus the client buffer can be shorter, reducing its cost.

The Implementation

Figure 2:
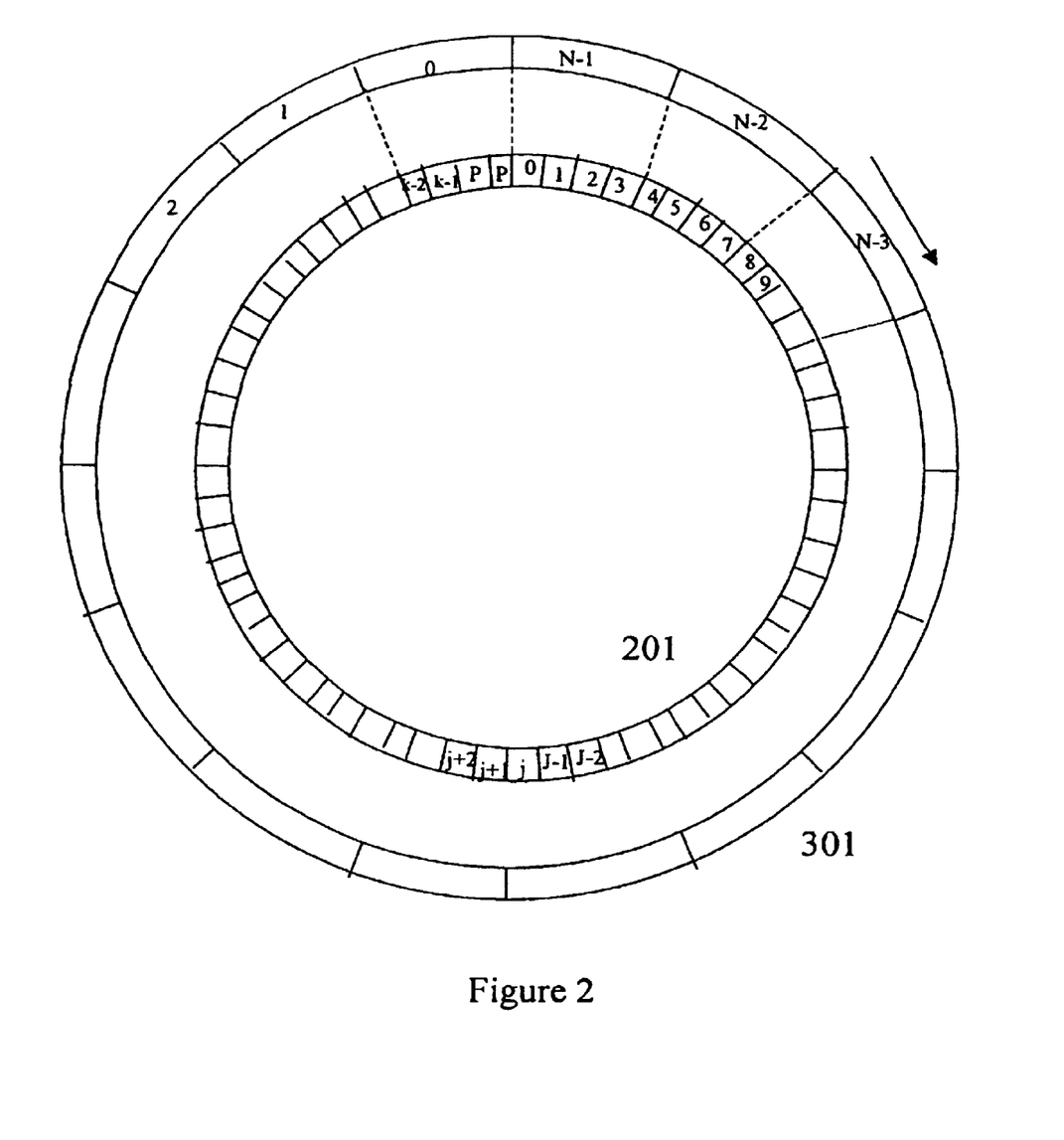
FIG. 2 shows the list of continuous media units and the list of slot units in the circular form and the relationship between the lists.

There exist various parameters used to implement this method. FIG. 2 shows a list that contains pointers to the elements of a continuous media flow, which is represented by the internal circumference 201. The flow units vary from 0 to k-1. To this flow can or cannot be added other units to complete the circumference, the padding, which is represented in the FIG. 2 201 by the letter P.

An indexing unit can also represent a flow unit. An indexing unit can be as small as one bit or up to a set of bits such as a word, a set of words, a video frame, or even a set of video frames. The flow's content is indexed in an ordered form so that the access to its content is not only sequentially made but also can be made at random. The unit that is to be used in this report so as to exemplify the functioning of C-DCM is the GoF (Group of Frame) of a compressed video based on the MPEG standard, but it could be of any digital video format, whether compressed or not. Integrated with List 201 there exists a list of slots 301 that preferably rotates clockwise. The slots are numbered from 0 to n-1 and represent time intervals in such a way that these n slots have the same duration as the media plus padding. Since the LSU 301 rotates over list 201, new units of list 201 always enter to the slot as well as leave from it. Since the elements that enter and leave the slots are pointers to the cache, this does not means that a video unit enters into the slot, but that it is possible through lists 201 and 301 to control the cache content. In the FIG. 2, slot n-2 contains the list elements that point to the video units from 4 to 7. For each media there will be a control structure composed by 201 and 301.

The control of contents uses the concept of collapsed buffer that is a virtual buffer mapped on the list 301 in the FIG. 2. A collapsed buffer is constituted of 4 slots as shown in the segment of list 301.

The Collapsed Buffer

Figure 3:
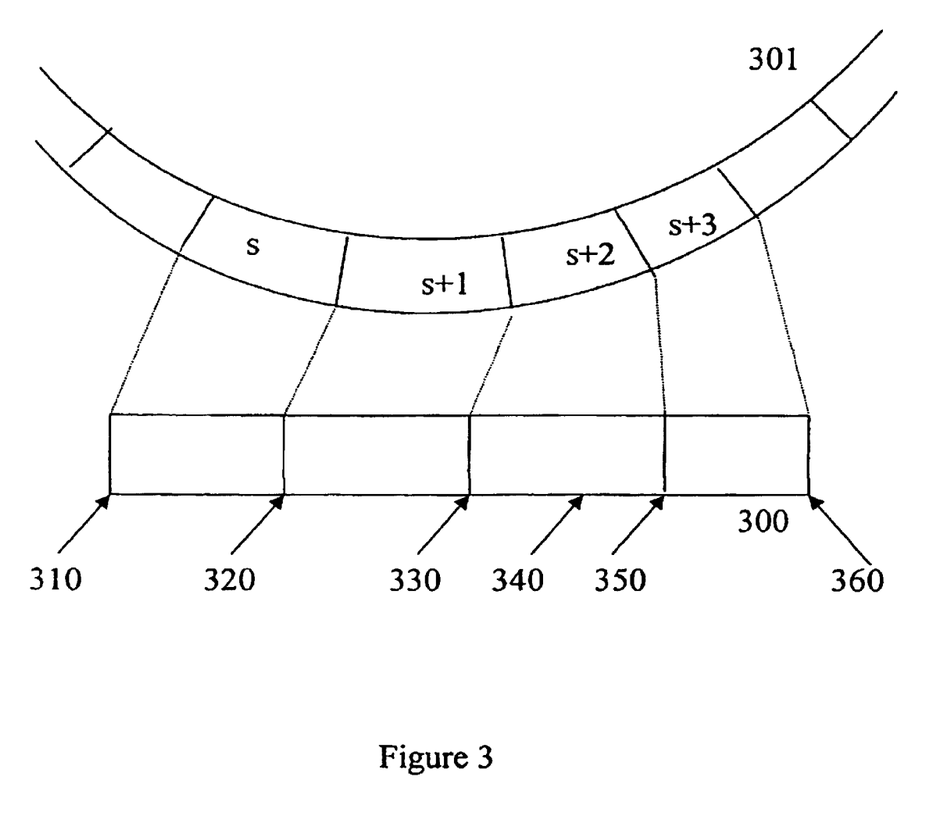
FIG. 3 shows the conceptual divisions of the collapsed buffer and its relationship with the slots of the LSU.

A collapsed buffer 300 is divided as follows:

Beginning of buffer 310—it coincides with the end of slot s. Sooner GoF pointers pass this point they are marked as out of buffer, and thus with a higher priority to be discarded. The content within s has already been read and sent to clients, but stay in with a certain priority of reservation to make possible a rewind operation.

Read 320—it coincides with the beginning of slot s and points to the next GoF to be viewed by the client. After passing this pointer, video elements are marked as being already read.

Minimum 330—it coincides with the beginning of slot s+1 and indicates when the buffer is to reach the point of minimum level, generating a signal to the C-DCM manager to take the necessary measures to start a new flow to refill the buffer, avoiding a possible underflow. All of the content that it points to is reserved, and cannot be discarded.

Write 340—it points to the position where the next incoming GoF should be stored. Usually, it should be located between pointers 330 and 350. If it is below 330 it indicates a risk of underflow and if it is above 350 it indicates a risk of overflow.

Maximum 350—it coincides with the start of slot s+3. It indicates the risk of buffer overflow. When the buffer is reaching this level, the client generates a signal to the C-DCM, which will take the necessary actions to prevent a buffer overflow and corresponding lost of GoFs.

End 360—it coincides with the beginning of slot s+3. It indicates the end of physical space assigned to the buffer. The previous content before this limit can be discarded. If this content will not be read, it can be reserved with temporary slots.

Temporary Slots

These are slots that do not make part of collapsed buffers but can have their contents reserved for either concatenating or increasing the length of collapsed buffers.

The Local Method

The cache content pointed to by each collapsed buffer is guaranteed to support one or more clients, i.e., the system cannot discard the cache content that is to be transmitted. Two or more collapsed buffers can have their contents overlapped, that is, they are superimposed and thus share slots in common. In this way, it avoids unnecessary replication and optimizes the use of memory, which can be utilized to allocate temporary buffers or to simply leave in the cache media contents that are often accessed such as the initial part of films of large audience. Collapsed buffers that are superimposed or concatenated act as a single buffer regarded to the flow control that arrives at a proxy, and this control is performed by the buffer, called receiver, that receives the flow from another proxy or server. Other superimposed or concatenated buffers depend on the content that is already in the local memory, thus the control of the receiver's buffer is enough to guarantee the necessary content to other buffers.

A proxy should have preferably memory enough to allocate collapsed buffers for its local clients. In case of proxy 50 as shown in the FIG. 1, its clients are 80, 90, and 100, i.e., the clients that are served by the central access point 20 to whom proxy 50 is connected. For reasons of economy, a proxy can have less memory than necessary to allocate one collapsed buffer for each active client, since the probability that all these clients simultaneously open different media sessions is low. In addition, clients can share slots, mostly for popular films and during periods of time of large audience. On the other hand, if memory cost is low or if the objective is to maximize the reuse of media, a proxy can have much more memory than necessary to allocate one collapsed buffer for every local client.

The local C-DCM manager attempts to make continuous the greatest possible amount of collapsed buffers locally. For this purpose it makes use of temporary buffers. Once collapsed buffers become continuous, the next objective is to minimize the amount of flows sent to local clients, that is, flows that are close enough are grouped so that a single multicast flow can be sent, which diminishes the proxy's I/O workload.

Figure 5:
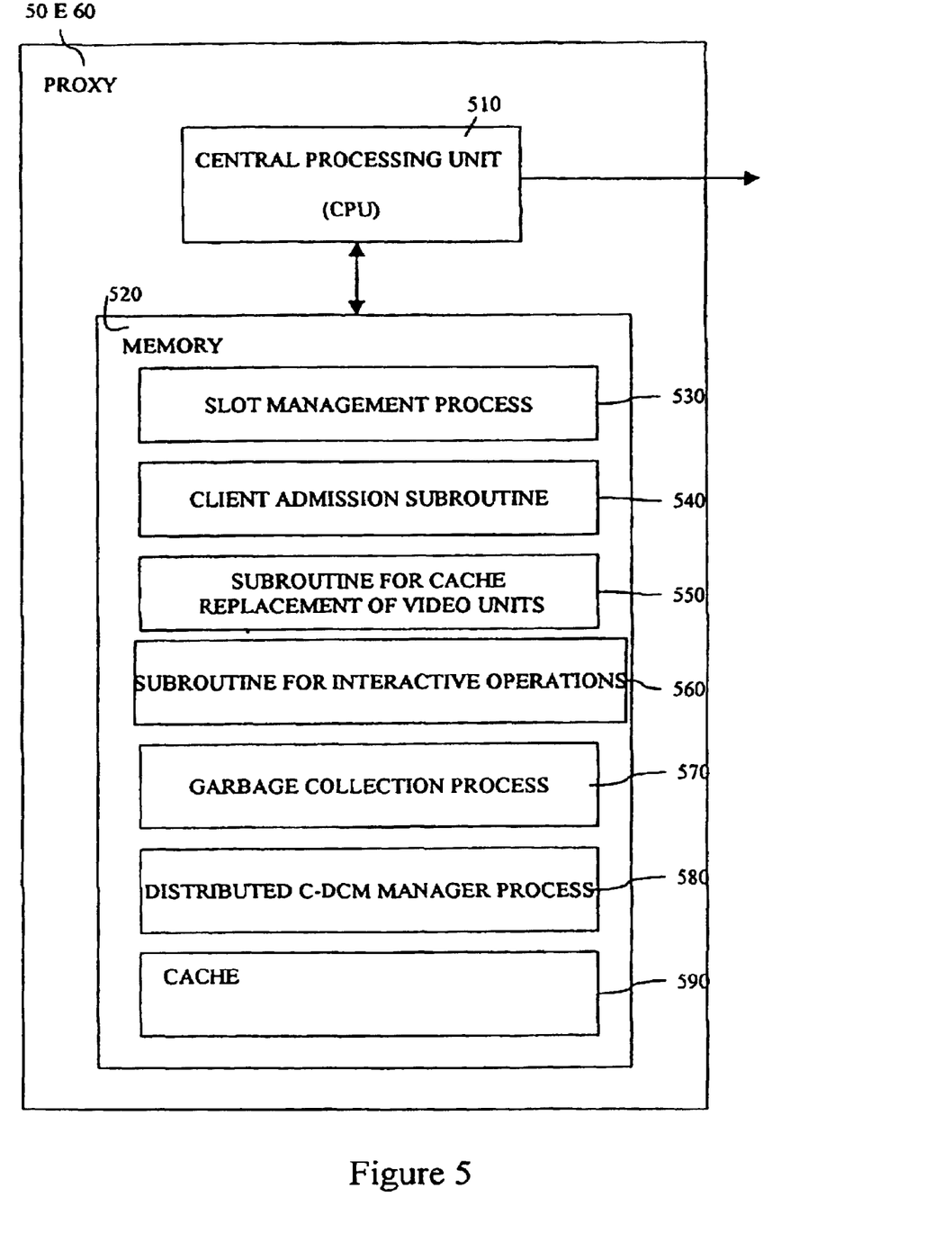
FIG. 5 is a block diagram illustrating the proxy's components.

As an example, FIG. 5 shows a block diagram that illustrates proxies 50 and 60. A proxy includes preferably a central processing unit (CPU) 510 and memory 520. The CPU can be a single processor or multiple processors in parallel. The instructions are stored in the memory (RAM, 510. The CPU preferably has a Unit of Logical and Arithmetic (ULA), a Unit of Control and a local memory such as cache of instructions and/or data or several registers. Such CPU architecture is well known. Proxy 50 or 60 can or cannot be embedded in communication equipment, such as DSLAM, Head end, or router/commuter.

Proxy 50 or 60 in FIG. 1 is preferably composed of (FIG. 5) a slot management process 530, a client admission subroutine 540, a subroutine for cache replacement of video units 550, and a subroutine for interactive operations 560, a process for garbage collection 570, and a manager process for distributed C-DCM 580 when there are two or more cooperative proxies, besides the cache itself 590.

Figure 6:
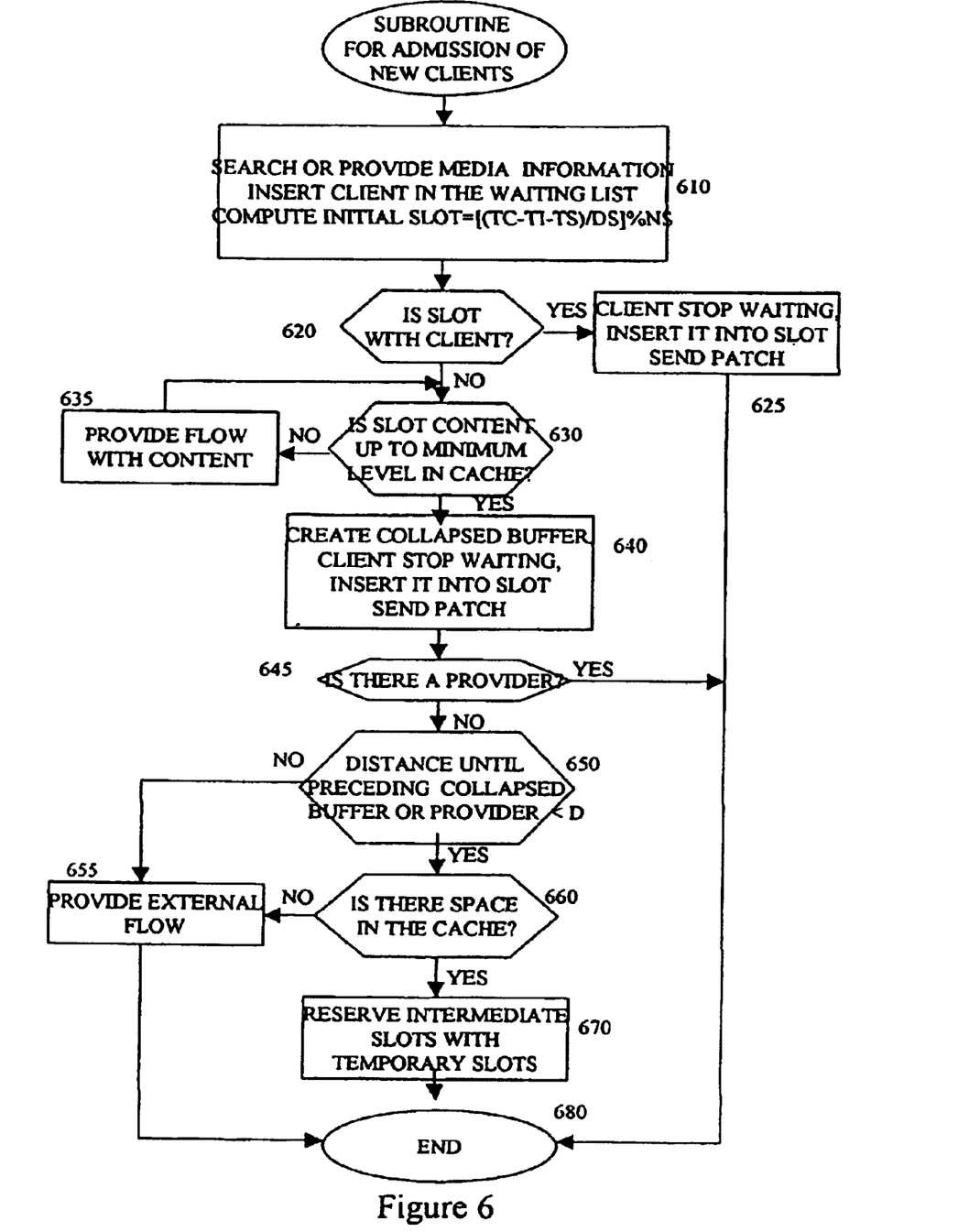
FIG. 6 is a flowchart describing an example of subroutine for admission of new clients.

A client request (cli) is processed by the client admission subroutine 540, as shown by the example in the flowchart of FIG. 6. When a client request arrives the list of medias (LM) 410 is searched for the requested media. If it is not found locally, the proxy moves towards the server in search for the media's meta-information and creates one more unit in the LM, together with LSU 430 and LCMU 450 structures, inserting the client into the waiting list of the LM element 410 that corresponds to the request. If the request is already in the LM then the client is inserted in the waiting list as before. Next, the initial slot s in the FIG. 3 is computed, and into which the client will be inserted 610. The initial slot s is calculated by diminishing the current time TC from start time TI at which the LSU began to rotate over the LCMU plus the initial time TS (Time Stamp) of the requested segment in relation to the beginning of the media. This value is also divided by the duration DS of a slot; the result is submitted to a module operation using the number of slots NS. To summarize, $S=[(TC-TI+TS)/DS]\% NS$, where the symbol % is the modulo operation that finds the remainder from a division and a real result is truncated to an integer value. As the client is requesting the initial segment TS is equal to zero. If the slot has already a client 620, that is, there already has a flow to another client, either unicast or multicast, starting from the GoF pointed by the beginning of slot s 420, the client is inserted into that flow and the part of flow that was missed, which is part of content under s, is sent as a patch 625. C-DCM works on networks that do or do not support multicast, though in the latter it is possible to emulate multicast using unicast. If slot s has no client, it is checked to see if the content that s encompasses until the minimum level 330 is in the cache 630, if it is not, the proxy provides a new flow from either the server or another proxy to provide the content 635. If the content is already in the cache the proxy creates a collapsed buffer and updates the status of slots that are within its limits, inserts the client that was in the waiting list into slot s, and sends a patch if it is necessary 640. If the buffer has a provider to supply the content 645 i.e. the client is a receiver then the admission process ends 680. Otherwise, it checks the distance until the previous collapsed buffer 650. If that distance is less than the one that compensates for avoiding a new external flow, it attempts to allocate temporary buffers so as to benefit from the content of the preceding receiver 670, provided there is enough space in the cache to allocate temporary slots 660, otherwise it starts a new flow with the required content 655.

Figure 7:
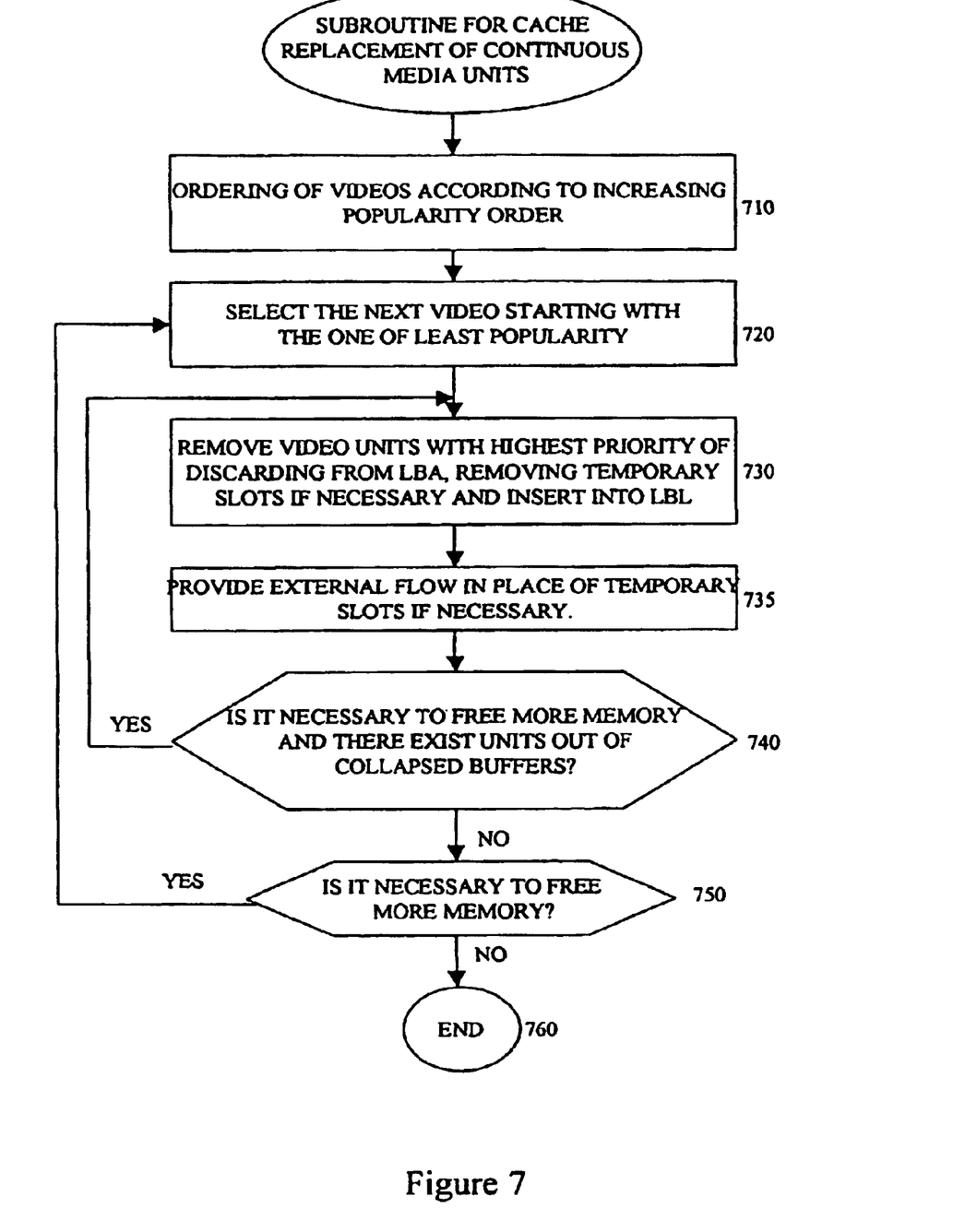
FIG. 7 is a flowchart describing an example of subroutine for cache replacement of video units.

The C-DCM works with the client's reservation of part of the cache through the use of a collapsed buffer. However, the content that stay outside of the buffer does not need to be discarded if there is room in the cache. In this manner, most frequently accessed parts of a media can continue in cache such as the beginning of a video, as well as the contents of temporary slots and contents that are left out of the cache due to overflow, or even the content of a popular media. Nevertheless, if the cache is full there is a need for substituting the non-reserved content for one that is going to be inside of a reserved slot. When the cache is full the substitution of media units FIG. 7 takes into account the media popularity. In this way, all the media units are ordered according to its popularity rank 710 in increasing order, and starting with that of lowest rank 720, the video units of highest priority of discarding are removed, as follows: (1) the ones that have been already read and are outside of the collapsed buffers; (2) the ones that in the beginning of the media and are not reserved; (3) the ones that have not been read but due to overflow are outside of the collapsed buffers, and lastly (4) removing temporary buffers 730. On removing temporary buffers, it is verified if there is a need to substitute them for an external flow, to supply the content of collapsed buffers on behalf of the temporary buffers that can be discarded 735. When choosing a media unit or temporary buffer to be discarded, in case of a tie, it will be first discarded the one that is farther from the previous collapsed buffer, that is, farther from being reused until the amount of necessary cache is released 740 and 750.

Figure 8:
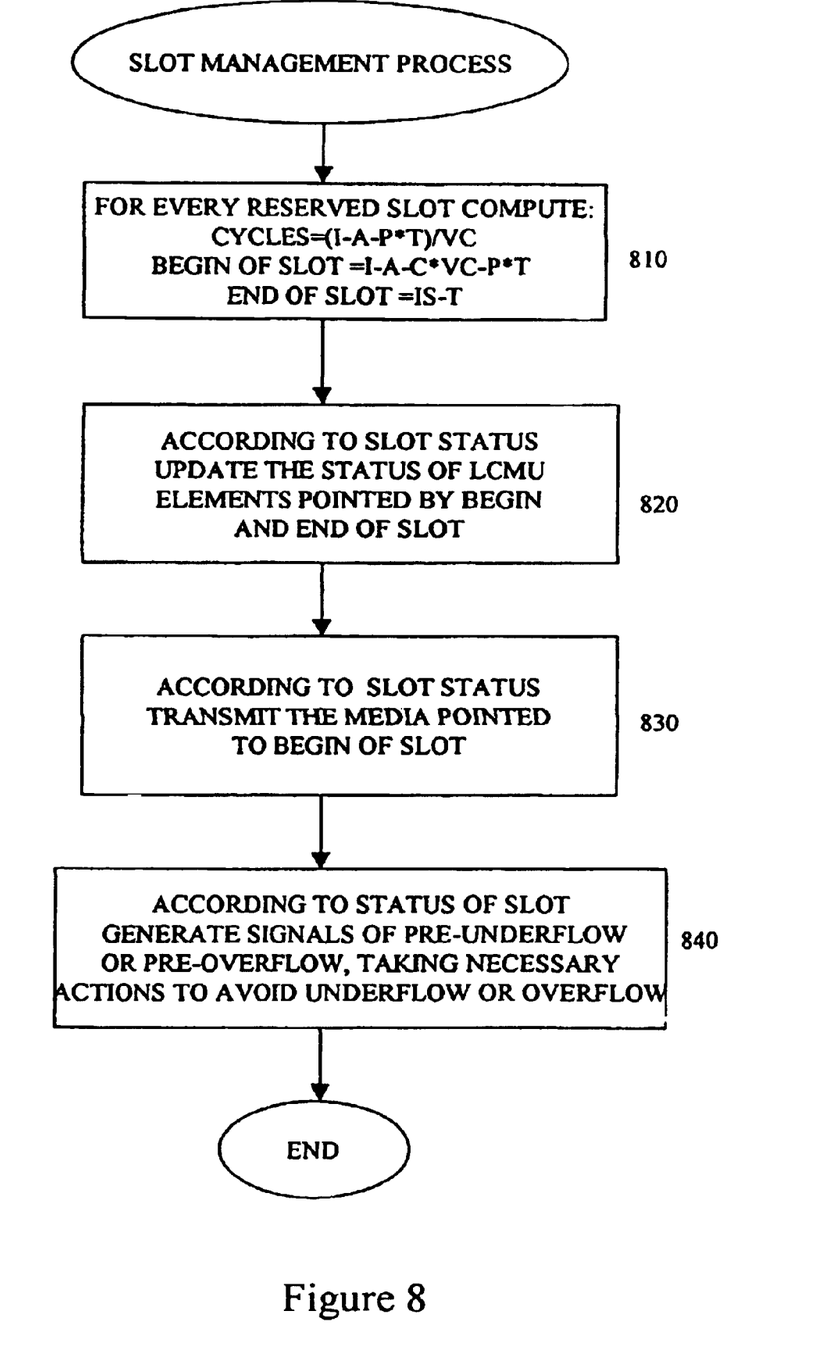
FIG. 8 is a flowchart describing an example of slot management process.

The collapsed buffer is a virtual C-DCM concept in that what does really control both content and flow is the slots. In the FIG. 3, a collapsed buffer is illustrated with 4 slots, but it could have just a single slot or more than 5 slots, actually this is a question of convention. Every slot has its status set in accord to its location in the collapsed buffer or if it is a temporary one or if it is not reserved. If it is not reserved it does not monitor its virtual content The content is said to be virtual because the slot does not store content, but only indicates which elements in the LCMU it is the manager of. If it is reserved, the slot manages its virtual content. Since the LSU rotates over the LCMU, after some time interval, the LSU can have rotated some times around itself. To calculate the start and end of slot using the media timestamp, it is necessary to know how many turns the slot performed up to current time. Given the instant of time I at which the LSU started to rotate, the period of time VC for a complete turn (the media duration plus padding), the current time A, and the position of slot P, then the number of cycles is calculated by the current time A less initial time I less slot position P times its length T divided by a complete turn VC, and the real result being truncated to integer values. Once the cycle is calculated, the slot start time is given by start time I less current time A less the number of cycles C times the time VC for a complete turn less slot position P times its length T. The end of slot FS is given by slot beginning IS less slot length T 810.

Both IS and FS return a time value in relation to the media's start time. Since GoFs can be accessed using either its sequential number or its timestamp, we can delimit the GoFs managed by a given slot through the simple calculation we described previously.

If a slot has the status of temporary slot the elements that pass the beginning of slot are marked as temporarily reserved and after leaving the slot they are marked as free 820.

If a slot is the slot s in the FIG. 3, the GoF that passes the end of slot 310 will be marked as free and the one that passes the beginning of slot 320 will be marked as reserved and read 820, given that on passing that point the GoF will be multicast to other clients that have been included in the list of clients of the slot 830.

If the slot is slot s+1 in the FIG. 3, for every element that passes the beginning of the slot 330 it is verified to see if it is in the cache, and if it is not, it means that the provider failed, and a pre-overflow warning is generated so that a new provider can be established 840.

Everything that a provider sends is written to the cache and the status is updated in the LCMU as written but not read. If the slot is s+1, s+2, or s+3, as GoFs pass the beginning-of-slot pointer 330, 350, or 360, they are updated as written, not read, and reserved 820.

If the slot is s+2 in the FIG. 3, and upon verifying the element that is passing the beginning of slot 350, besides updating its status, the slot generates a pre-overflow warning so that actions can be taken to avoid overflow if necessary 840.

If the slot is s+3, all the GoFs that are in the cache upon passing the beginning pointer 360 are updated as being not read and reserved 820.

For purposes of processing economy, the verification or/and updating of GoFs in the beginning or end of a slot can be dismissed if the status of the GoFs are not altered when passing from a slot to another. For example, on consecutive temporary slots, the status is only altered in the beginning of first slot and at the end of last slot.

The Distributed Method

Collapsed Buffers with non-empty intersection that are located in distinct proxies can be interconnected by a video flow that guarantees the receiver's minimum level, establishing cooperation between proxies and the need for coordinating such a cooperation with the objective of maximizing the use of system resources.

The distributed C-DCM manager 580 tries to chain continuous buffers of the proxies in order to reuse their contents. To increase the chaining degree so as to avoid the need of another flow from the server, continuous collapsed buffers can be augmented at the opposed end of the receiver by using a temporary buffer. The allocation priority of temporary slots depends on the amount of available memory and the number of remote clients that will reuse the content. The allocation priority is for small amount of temporary buffers that have high potential to server large number of remote clients, and is inverse of the discarding priority that is towards large number of temporary slots that have low potential of reuse (serve few clients). This is a question of trading off cache space (temporary buffers) for using bandwidth from both network backbone and server.

This means that, taking into consideration the slot hierarchy, in the absence of memory space, the content of largest discarding priority is the one that belongs to a non-reserved slot followed by the temporary buffer. The contents of slots that belong to a collapsed buffer are discarded only if the client stops using the system.

The distributed C-DCM manager as well as the local one maintains a mapping of the proxies' continuous buffers. With this information, the C-DCM manager is capable of chaining collapsed buffers. The C-DCM manager has to try to reuse the content of other proxies and only as the last option to resort to the server, avoiding however to generate a ping-pong traffic, which would congest the network backbone. To avoid ping-pong traffic proxies, which in turn request to their neighbors until the requested content is found or the request message arrives at the server. In this way, only the nearest proxy that has the requested content will send it. The neighboring proxies and the server are connected through persistent links that preferably reflect the network topology. Another way to do so is making all the proxies to have information about the state of other proxies, which is obtained in a distributed fashion, to calculate locally the proxy that will provide the requested content.

Interactive Operations

The interactive operations on the media comprise any client being able to definitively stop the media exhibition, to pause it temporarily, to start from the point it paused, to forward it to a certain point within the media and to start exhibiting the media from that point, and both to fast advance and to fast rewind while keeping exhibiting the media. Each of these interactive operations will be described next.

Stop Operation

For this operation, the proxy simply moves the client out of its list and frees the reserved resources accordingly.

Pause Operation

Figure 4A:
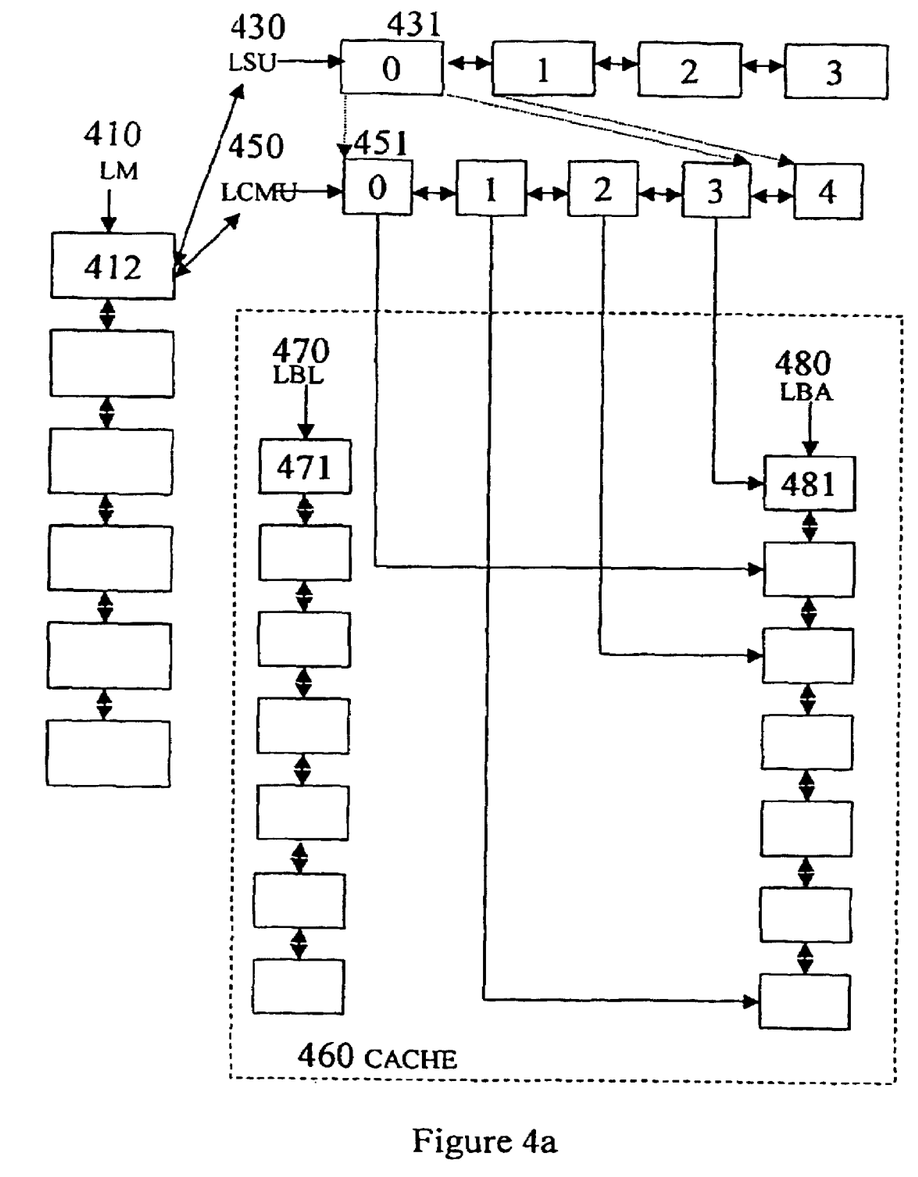
FIG. 4a is block diagram illustrating the relationship between various data structures used by C-DCM.
Figure 4B:
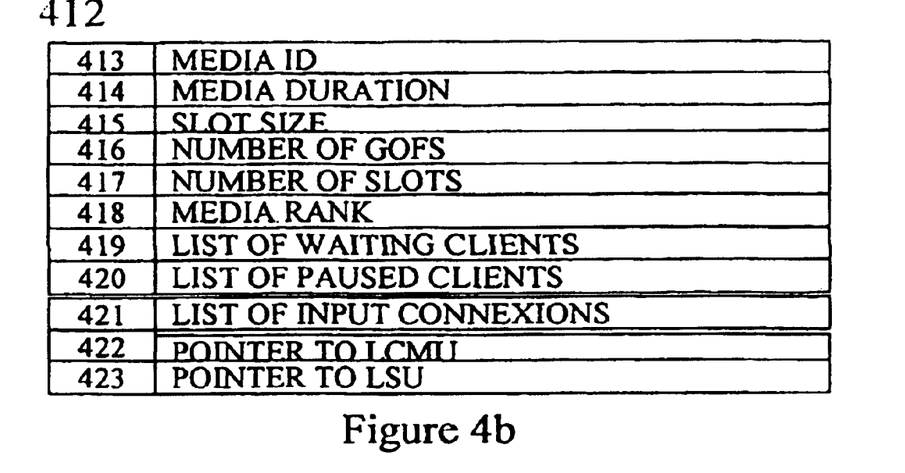
FIG. 4b exemplifies the data structure of a unit of the list of medias.
Figure 4C:
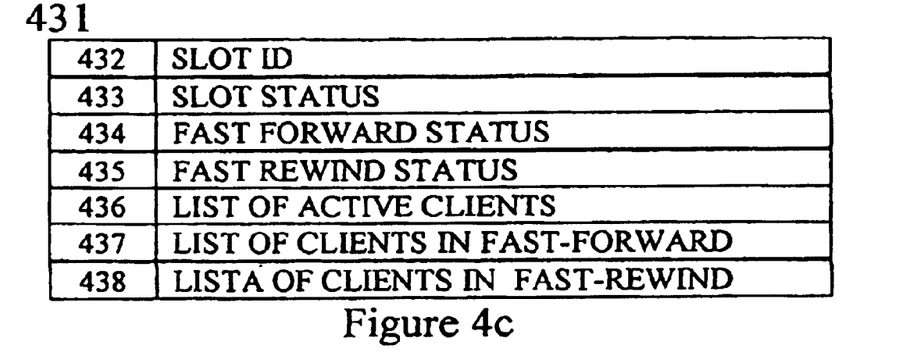
FIG. 4c exemplifies the data structure of a unit of the LSU.
Figure 4D:
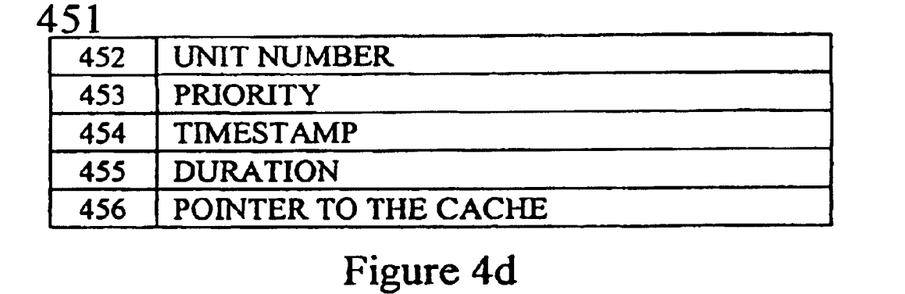
FIG. 4d exemplifies the data structure of a unit of LCMU.
Figure 4E:
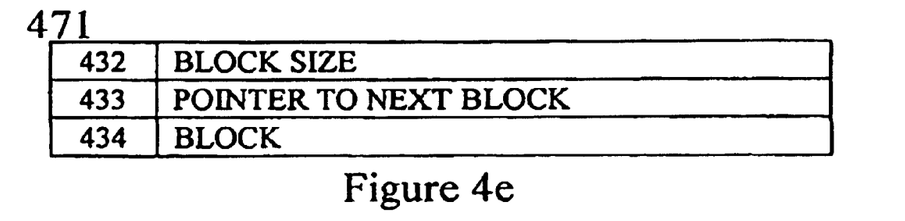
FIG. 4e exemplifies the data structure of a unit of LBA or LBL

In this operation, the proxy frees the slots of the collapsed buffer of the client that requested the operation, provided that there is no clients on the collapsed buffer, taking care to preferably reserve the content of s+2 and s+3 in the LCMU FIG. 3 as content of PAUSE and releasing the provider or temporary buffers if they are unnecessary to maintain the flow to other local or remote collapsed buffer; the content of s and s+1 are in the client's local buffer. The client moves from the list of active clients 436 to the list of clients in pause 420, which besides recording the client identity, stores information on which content was reserved. A time limit can be established during which the content stays reserved as pause content, depending on the film popularity, so as to optimize the use of the cache.

Restart Operation

In this operation, the client informs the point at which the exhibition should restart. This procedure is similar to the one for client admission except that part of the content is already in the local buffer, and part of it will be preferably in the cache. The reserved content in the cache during a pause is synchronized with the list of slot units, removing the pause reservation and keeping only with the slot reservation. The slot that is to be synchronized is calculated according to the formula already described to locate the initial slot when admitting a new client except that the initial time of segment is the time of segment that is in the cache. The client also leaves the list 420 and enters into the list 436 of slot s that forms its collapsed buffer.

Jump Operation

In this operation, the client informs the point to which the media should advance, case of the media is being exhibited; the proxy frees the reserved resources if they have not been reserved for other clients and if they are unnecessary to maintain the flow to other local or remote collapsed buffer, after which the procedure is equal to the admission of a new client, except that the film will not be exhibited from the beginning but from the point that the client chose randomly, for which it uses the same formula described previously.

Fast Forward Operation

This and next operation are the ones that demand most of system resources. Thus they should be used preferably together with the JUMP operation, followed by rewinding or fast forwarding until arriving at the desired point of the media. The quality of exhibition may be sub-optimal so that if any lost of GoFs occur, they can be tolerated. On asking for this operation, the slots of the client's collapsed buffer are reserved and controlled by the process for interactive operations (PIO) 560 that is created for the client. This process reserves preferably n slots ahead of the collapsed buffer, and prefetches the content that is missing in those n slots, from either the server or a cooperative proxy. Since proxies keep information on the medias that are in their caches in the LM, LSU, and LCMU, these lists can be searched to verify if the requested media segment is in cache, and if it is not the proxy transfers the request for prefetching to the next cooperative proxy, or to the server as the last resort. Given that this operation requires transmission of n times more contents than the normal case, it is necessary that the non-read part of collapsed buffer has preferably a size n times greater to anticipate the prefetching for the content that is going to be exhibited at high speed. As this augmented collapsed buffer to move over the LCMU 450 with a different speed from that of LSU 430, PIO 560 forces the augmented collapsed buffer moves over the LSU 430 with a speed that is n-1 times the normal one. While reading the content if it does not have any other reservation the corresponding slots are released at the same n-1 speed for possible discard, if the slot is neither used by a temporary buffer nor belongs to a collapsed buffer. For, the PIO 560 increments the fast-forward status 434 and inserts the client into the list of fast-forward 437, so as to make reservation ahead, while decrements the fast-forward status 434 and removes the client from the list of fast-forward clients 437 for the slots behind. In addition, it sends the content to the client at a speed that is n times superior to the normal one. Usually, n is equal two, i.e., it exhibits a speed that is twice faster than the normal one.

Fast Rewind Operation

This operation is implemented in a way similar to fast forward, except that GoFs are reserved and prefetched backwards, making the augmented collapsed buffer to move over the LSU at a speed that is n+1 times the normal one and on the opposite direction of exhibition.

The Garbage Collector

In the C-DCM the function of garbage collection 570 is to eliminate reservations left by any client that had a silent failure or simply left the system without warning, leaving slots and memory areas reserved. The process of garbage collect 570, from time to time walks through the list of clients, checking if they are still actives, if it finds an inactive client, it removes the client from the list and if it is the only client of a reserved slot, this slot is updated to become non-reserved and its content is released for discarding by the subroutine for substitution of continuous media units in the cache.

The invention claimed is:

1. "Collapsed distributed cooperative memory for interactive and scalable media-on-demand systems" characterized by a method for managing a cache memory of a proxy server associated with a continuous media file, said method comprising the steps of:

using reservation of memory space in the cache memory to store segments of said continuous media file, wherein, the space of reserved memory in the cache works as a collapsed buffer in which stored segments of said continuous media file are continuously discarded to provide room for subsequent segments of said continuous media file, a collapsed buffer is allocated in the cache for every client of the system, and the memory area of said collapsed buffer is shared with other collapsed buffers provided that its content is the same;

creating a circular list with indexing units of said continuous media file and another circular list of slots such that a relation exists from every element of the first list over an element of the second list at any time, and the circular list with the indexing units of said continuous media file points to the memory area where the file segment is stored, if said file segment is in the cache;

rotating the circular list of slots over the circular list with indexing units of said continuous media file, or vice-versa, such that the new units of indexing of said continuous media file enter and leave the slots;

reserving slots for every client, said reserved slots forming the client's collapsed buffer, and the content delimited by a reserved slot is not discarded;

making a single slot part of other collapsed buffers; and replacing a segment of said continuous media file that is not delimited by said reserved slots with new data when there is no more cache space available under any replacement policy.

2. "Collapsed distributed cooperative memory for interactive and scalable media-on-demand systems" characterized by a method comprising the steps of:

managing a cache memory of a proxy server associated with a continuous media file, including the steps of:

using reservation of memory space in the cache memory to store segments of said continuous media file, wherein, the space of reserved memory in the cache works as a collapsed buffer in which stored segments of said continuous media file are continuously discarded to provide room for subsequent segments of said continuous media file, a collapsed buffer is allocated in the cache for every client of the system, and the memory area of said collapsed buffer is shared with other collapsed buffers provided that its content is the same;

creating a circular list with indexing units of said continuous media file (LCMU) and another circular list of slots (LSU) such that a relation exists from every element of the first list over an element of the second list at any time, and the circular list with the indexing units of said continuous media file points to the memory area where the file segment is stored, if said file segment is in the cache;

rotating the circular list of slots over the circular list with indexing units of said continuous media file, or vice-versa, such that the new units of indexing of said continuous media file enter and leave the slots;

reserving slots for every client, said reserved slots forming the client's collapsed buffer, and the content delimited by a reserved slot is not discarded;

making a single slot part of other collapsed buffers; and replacing a segment of said continuous media file that is not delimited by said reserved slots with new data when there is no more cache space available under any replacement policy;

said method further including the step of:

delimiting the content of a slot, from a beginning IS until an end FS, as a function of (a) initial time I, the initial time I being a time when a beginning of said circular list of continuous media units (LCMU) and a beginning of said circular list of slot units (LSU) are at a same position and a first client starts watching a movie from its beginning, (b) current time A,
(c) slot position P that is a slot position in the circular List of Slot Units (LSU) in relation to the beginning of the LSU,
(d) slot size T that is the duration of a slot in time units,
(e) a time for a complete turn VC that is a period of time measured between an instant of time when the beginning of each of the two lists (LSU and LCMU) are at the same point and an instant of time after one rotation when the beginnings of the two lists are back at the same point, and
(f) a number of complete turns C that is the number of complete rotations of one list over the other,
said function given by the formulas $C=(A-I-P*T)/VC$, $IS=I-A-C*VC-P*T$, and $FS=IS-T$, and real results of the formulas being truncated to integer values.

3. "Collapsed distributed cooperative memory for interactive and scalable media-on-demand systems" characterized by a method comprising the steps of:
managing a cache memory of a proxy server associated with a continuous media file, including the steps of:
using reservation of memory space in the cache memory to store segments of said continuous media file, wherein,
the space of reserved memory in the cache works as a collapsed buffer in which stored segments of said continuous media file are continuously discarded to provide room for subsequent segments of said continuous media file,
a collapsed buffer is allocated in the cache for every client of the system, and
the memory area of said collapsed buffer is shared with other collapsed buffers provided that its content is the same;
creating a circular list with indexing units of said continuous media file (LCMU) and another circular list of slots (LSU) such that a relation exists from every element of the first list over an element of the second list at any time, and the circular list with the indexing units of said continuous media file points to the memory area where the file segment is stored, if said file segment is in the cache;
rotating the circular list of slots over the circular list with indexing units of said continuous media file, or vice-versa, such that the new units of indexing of said continuous media file enter and leave the slots;
reserving slots for every client, said reserved slots forming the client's collapsed buffer, and the content delimited by a reserved slot is not discarded;
making a single slot part of other collapsed buffers; and
replacing a segment of said continuous media file that is not delimited by said reserved slots with new data when there is no more cache space available under any replacement policy;
said method further including the step of:
computing a slot S of said circular list of slot units (LSU) that is related with a segment of a requested continuous media file defined by a function of
(a) current time TC,
(b) initial time TI that is an instant of time when a beginning of said circular list of continuous media units (LCMU) and a beginning of said circular list of slot units (LSU) are at a same position and a first client starts watching the media from its beginning,
(c) start time of the requested segment time stamp TS that is an instant of time in relation to the beginning of the media,
(d) duration of slot DS, and
(e) number of slots NS in said list of slot units (LSU),
said function given by the formula $S=[(TC-TI+TS)/DS] \%NS$, in which the symbol % is the module operation that finds the remainder from a division, and a real result of the formula being truncated to an integer value.

4. "Collapsed distributed cooperative memory for interactive and scalable media-on-demand systems" according to claim 1, further comprising:
managing content that is out of collapsed buffers in combination with content in the collapsed buffers, including
reserving temporary slots either to concatenate said collapsed buffers or to augment said collapsed buffers when there is memory space in a cache,
releasing said temporary slots that concatenate said collapsed buffers when there is no memory space in the cache, and
providing a replacement of content by a flow of external continuous media from either a video server or another video proxy, if necessary.

5. "Collapsed distributed cooperative memory for interactive and scalable media-on-demand systems" according to claim 1, further comprising:
a method for quick access to media segments of said continuous media file for performing fast-forward and fast-rewind, with media visualization using said collapsed buffers held in a memory of a proxy server, which is distinct from a memory of a Media-On- Demand Server and is also distinct from a memory of a client machine, said method including:
sending necessary media file segments for fast exhibition of said continuous media file backward and forward, said media file segments being stored in said collapsed buffers held in the proxy server;
a C-DCM manager finding in the memory of the proxy server the slots that have the media segments being requested;
said C-DCM manager going through the list of slot units (LSU) held in said proxy server;
said C-DCM manager making reservation of said continuous media file content for fast exhibition by augmenting the collapsed buffers held in the proxy server with more slots that are available in the memory of said proxy server; and
said C-DCM manager going through the list of slot units (LSU) of the augmented collapsed buffer to support fast transmission speed.

6. "Collapsed distributed cooperative memory for interactive and scalable media-on-demand systems" according to claim 1, further comprising:
a method of implementing videocassette functions in a scalable video-on-demand system, said method including:
a proxy server that upon a pause operation, keeps the content of said collapsed buffer in the memory of said proxy server for reducing the response time of a restart operation, said proxy server memory being distinct from the memory of a Media-On-Demand server and also from the memory of a client equipment;
upon a pause operation, said proxy server either keeping reserved slots allocated to complement the collapsed buffer held in the proxy server for a client that requested the pause operation if there is enough space in the memory of said proxy server and said reserved slots are necessary to maintain a video stream to the other collapsed buffers, or said proxy server providing a new external video stream source from one of the Media-On-Demand server and other proxy server;

upon the restart operation, the proxy server making reservation of slots for the collapsed buffer in the proxy server memory and the proxy server starting to consume the reserved content held after the pause, providing a constant stream of video content either by making reservation of temporary slots in the proxy server memory or using one of an external stream source (i.e., the Media-On-Demand server) and another proxy server; and upon performing one of a fast forward operation and a fast rewind operation without media exhibition, the proxy server shifting the collapsed buffer in the proxy server memory until said proxy server reaches an exhibition point the client requested.

7. "Collapsed distributed cooperative memory for interactive and scalable media-on-demand systems" according to claim 1, characterized by a distributed method of managing the cache of distributed proxy servers, comprising linking collapsed buffers on different proxy servers through the use of temporary buffers, if necessary and there exists memory space in the cache, combined with a flow of continuous media from a proxy server to the other.

8. "Collapsed distributed cooperative memory for interactive and scalable media-on-demand systems" according to claim 1, characterized by a distributed method of managing the content of collapsed buffers in two or more distributed proxy servers, including an intelligent proxy that knows how to walk through collapsed buffers and contiguous temporary collapsed buffers of distinct proxy servers, in order to locate the necessary segment to supply and to complete the missing segments of reserved slots of other proxy servers.

9. "Collapsed distributed cooperative memory for interactive and scalable media-on-demand systems" according to claim 1, characterized by using one of vector data structure, stack data structure, table data structure, and matrix data structure, instead of circular list data structure, in order to economize memory space.

10. "Collapsed distributed cooperative memory for interactive and scalable media-on-demand systems" according to claim 1, characterized by, a method of increasing a margin of security, to guarantee the quality of presentation of video without undesirable exhibition stops, including the step of when said collapsed buffer becomes below its minimum level of work, said collapsed buffer notifies a C-DCM manager to provide another flow source.

11. "Collapsed distributed cooperative memory for interactive and scalable media-on-demand systems" according to claim 1, characterized by, a method of memory garbage collection, that is, content that is to be discarded, but with pending reservations owing to missing client's notification because of either silent failure or the client left the system without sending previous notification.

12. "Collapsed distributed cooperative memory for interactive and scalable media-on-demand systems" according to claim 1, characterized by, the method being executed by either a proxy server or any of dslam, head end, a commuter or router, whether it is or not embedded in the equipment.

13. "Collapsed distributed cooperative memory for interactive and scalable media-on-demand systems" according to claim 1, characterized by a system that knows when to use unicast to emulate a multicast.

* * * * *